United States Patent
Chiasson et al.

(10) Patent No.: US 7,039,282 B2
(45) Date of Patent: May 2, 2006

(54) OPTICAL FIBER ARRAY WITH AN INTERMITTENT PROFILE AND METHOD FOR MANUFACTURING THE SAME

(75) Inventors: David W. Chiasson, Hickory, NC (US); Christopher M. Quinn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 92 days.

(21) Appl. No.: 10/880,905

(22) Filed: Jun. 30, 2004

(65) Prior Publication Data

US 2006/0002669 A1    Jan. 5, 2006

(51) Int. Cl.
*G02B 6/44*    (2006.01)
(52) U.S. Cl. .................................................. 385/114
(58) Field of Classification Search .................. 385/114
See application file for complete search history.

(56) References Cited

U.S. PATENT DOCUMENTS

| | | | |
|---|---|---|---|
| 4,547,040 A | 10/1985 | Yamamoto et al. | 350/96.34 |
| 4,653,852 A | 3/1987 | Suzuki et al. | 350/96.33 |
| 4,720,165 A | 1/1988 | Tokuda et al. | 350/96.24 |
| 4,752,112 A | 6/1988 | Mayr | 350/96.23 |
| 4,861,135 A | 8/1989 | Rohner et al. | 350/96.23 |
| 4,900,126 A | 2/1990 | Jackson et al. | 350/46.23 |
| 5,208,889 A | 5/1993 | Cedrone et al. | 385/114 |
| 5,442,722 A | 8/1995 | DeCarlo | 385/114 |
| 5,457,762 A | 10/1995 | Lochkovic et al. | 385/114 |
| 5,486,378 A | 1/1996 | Oestreich et al. | 427/163.2 |
| 5,524,164 A | 6/1996 | Hattori et al. | 385/114 |
| 5,598,498 A | 1/1997 | Comezzi | 385/114 |
| 5,673,352 A | 9/1997 | Bauer et al. | 385/114 |
| 5,717,805 A * | 2/1998 | Stulpin | 385/114 |
| 5,761,363 A | 6/1998 | Mills | 385/114 |
| 5,933,559 A | 8/1999 | Petisce | 385/114 |
| 5,970,196 A | 10/1999 | Greveling et al. | 385/114 |
| 5,982,968 A | 11/1999 | Stulpin | 385/114 |
| 6,006,000 A | 12/1999 | Tuttlebee | 385/114 |
| 6,018,605 A | 1/2000 | Mills et al. | 385/114 |

(Continued)

FOREIGN PATENT DOCUMENTS

EP    0749129 B1    12/1996

(Continued)

OTHER PUBLICATIONS

N. Andrew Punch, Jr., Shail K. Moorjani, Steven T. Bissell, and Karen E. Williams, Craft-Friendly 24-Fiber Ribbon Design, IWCS 1999, pp. 72-78.

(Continued)

*Primary Examiner*—Frank G. Font
*Assistant Examiner*—Ryan Lepisto
(74) *Attorney, Agent, or Firm*—Michael E. Carroll, Jr.

(57) ABSTRACT

An optical fiber array having a plurality of intermittent weakened portions allows subunit or groups of the fibers in the optical fiber array to be accessed without the need for special tools and a method for manufacturing the same are provided. In one embodiment, the optical fiber array includes at least two subunits, each of the subunits having a respective subunit matrix, and the optical fiber array also includes a common matrix having a plurality of intermittent weakened portions. In another embodiment, the plurality of intermittent weakened portions of the optical fiber array are formed by a common matrix having two different thickness profiles adjacent along respective portions of a subunit interface.

35 Claims, 5 Drawing Sheets

U.S. PATENT DOCUMENTS

| | | | |
|---|---|---|---|
| 6,025,422 A | 2/2000 | Hall | 524/405 |
| 6,028,976 A * | 2/2000 | Sato et al. | 385/114 |
| 6,097,866 A | 8/2000 | Yang et al. | 385/114 |
| 6,160,941 A | 12/2000 | Yang | 385/114 |
| 6,175,677 B1 * | 1/2001 | Yang et al. | 385/114 |
| 6,253,013 B1 | 6/2001 | Lochkovic et al. | 385/114 |
| 6,309,567 B1 | 10/2001 | Okuno et al. | 264/1.27 |
| 6,337,941 B1 * | 1/2002 | Yang et al. | 385/114 |
| 6,381,390 B1 | 4/2002 | Hutton et al. | 385/114 |
| 6,434,305 B1 | 8/2002 | Lochkovic et al. | 385/114 |
| 6,535,673 B1 | 3/2003 | Lochkovic | 385/114 |
| 2002/0025128 A1 | 2/2002 | Hwang | |
| 2003/0223713 A1 | 12/2003 | Chiasson et al. | |
| 2004/0022512 A1 * | 2/2004 | Sato et al. | 385/128 |

FOREIGN PATENT DOCUMENTS

| | | |
|---|---|---|
| EP | 0822432 A1 | 2/1998 |
| EP | 0843187 A1 | 5/1998 |
| EP | 0856761 A1 | 8/1998 |
| GB | 2029629 A | 8/1979 |
| JP | 58-143303 | 8/1983 |
| JP | 1-138517 | 5/1985 |
| JP | 1-137208 | 5/1989 |
| JP | 1-138518 | 5/1989 |
| JP | 1-245208 | 9/1989 |
| JP | 1-251005 | 10/1989 |
| JP | 2-56510 | 2/1990 |
| JP | 2-190805 | 7/1990 |
| JP | 07120645 A | 5/1995 |
| JP | 08129122 A | 5/1996 |
| JP | 08262292 A | 10/1996 |
| JP | 09113773 A | 5/1997 |
| JP | 09197213 A | 7/1997 |
| JP | 09218328 A | 8/1997 |
| JP | 2000-137136 | 5/2000 |
| WO | WO94/23323 | 10/1994 |
| WO | WO97/05515 | 2/1997 |

OTHER PUBLICATIONS

R. S. Wagman, G. A. Lochkovic, K. T. White, "Component Optimization for Slotted Core Cables Using 8-Fiber Ribbons", IWCS 1995, pp. 472-478.

* cited by examiner

OPTICAL FIBER ARRAY WITH AN INTERMITTENT PROFILE AND METHOD FOR MANUFACTURING THE SAME

FIELD OF THE INVENTION

The present invention relates to an optical fiber array with an intermittent profile and method of manufacturing the same. More particularly, the present invention relates to an optical fiber array that provides a solution for easily and reliably splitting out of, for instance, optical fiber subunits, particularly for midspan applications, without the need for tools or objects that may cause deleterious effects to the optical fiber array.

BACKGROUND OF THE INVENTION

There are prior art methods and apparatus for separating an optical fiber array into subsets or subunits that contain optical fibers. One prior art method of separating optical fiber from an array having a single matrix material requires using a special tool for precisely separating a predetermined number of optical fibers from the optical fiber array. The special tool inhibits the craftsman from damaging the optical fibers; however, the tool is relatively expensive. As such, the craftsman may not have the necessary tool and will simply use a utility knife or other sharp implement, or try to twist the optical fiber array to separate the correct number of optical fibers from the array. However, these methods of separation are typically unreliable because they can result in stray optical fibers or damage to the optical fibers such as abrasions, cuts, or other damage that affects optical performance. Additionally, if there the optical fiber array is carrying live traffic there may be an increase optical attenuation that interrupts the transmission of information, thereby causing an error in transmission.

Consequently, optical fiber arrays were developed that use a plurality of subunits having a distinct matrix material, i.e., each subunit has a respective subunit primary matrix, surrounded by a common matrix that holds the respective subunits together. Thus, with this construction respective subunits of the array remain intact when separated. However, optical fiber arrays having the plurality subunits still have drawbacks. For instance, it can be difficult for the craftsman to start the separation of the subunits. Additionally, if the craftsman can begin the separation of the subunits the fracturing of the common matrix may be random, thereby creating undesirable wings on common matrix during the splitting of the subunits. Wings are undesirable because they can interfere with fusion splicing, organization, stripping, and splicing. Likewise, wings may also cause the removal of identification markings. Consequently, the craftsman may still opt to use a special tool for separating the subunits and avoid the formation of wings during separation of subunits.

Accordingly, the present invention is directed to an optical fiber array that substantially obviates one or more of the problems and disadvantages in the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

BRIEF DESCRIPTION OF THE DRAWINGS

The accompanying drawings are included to provide a further understanding of the invention and are incorporated in and constitute a part of the specification. The drawings illustrate several embodiments of the invention and together with the description serve to explain the principles of the invention.

DETAILED DESCRIPTION OF THE INVENTION

Figure 1:
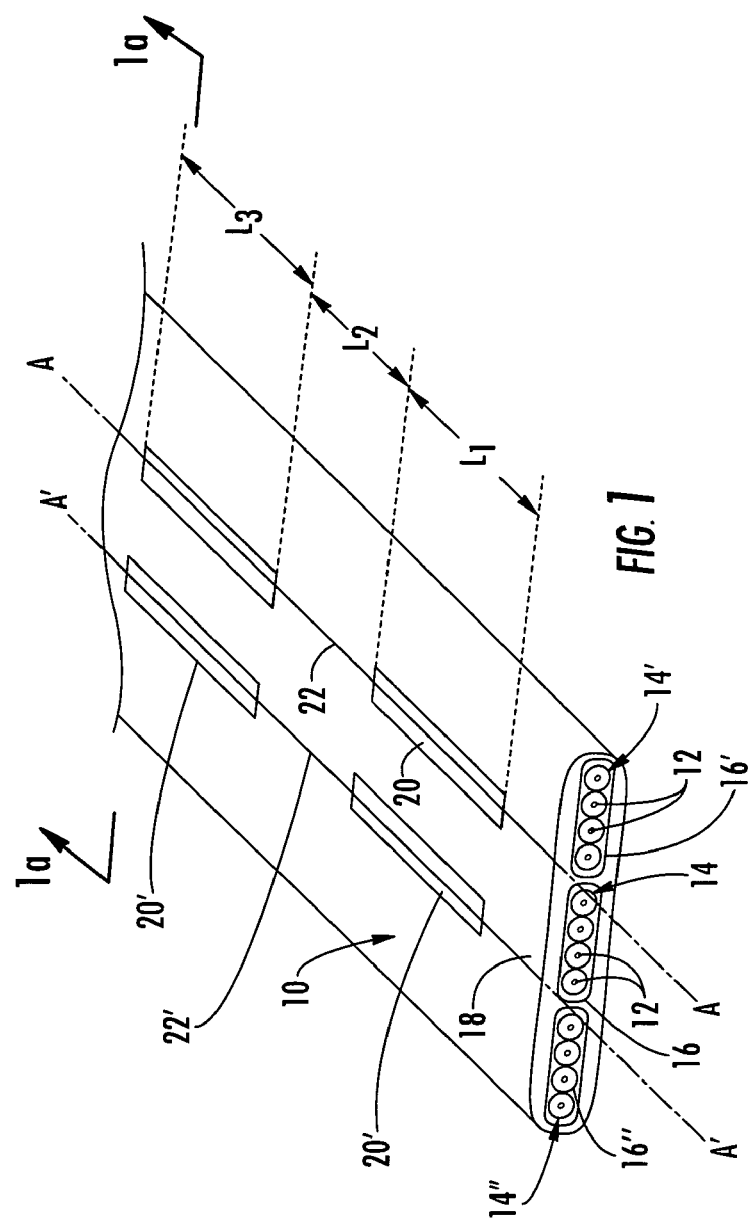
FIG. 1 is a perspective view of one embodiment of an optical fiber array according to the present invention.
Figure 1A:
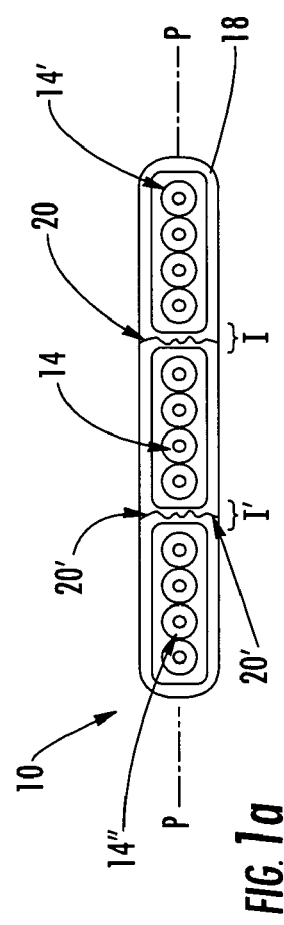
FIG. 1a is a cross-sectional view of the embodiment of the optical fiber array of FIG. 1.

FIGS. 1 and 1a illustrate an exemplary embodiment of an optical fiber array 10 according to the present invention. The embodiment of the optical fiber array 10 in FIG. 1 has a plurality of optical fibers 12. In this case, the plurality of optical fibers 12 are preferably disposed into separate subunits 14, 14', and 14". Subunits 14, 14', and 14" each preferably have a respective subunit matrix 16, 16' and 16" that connects, but preferably completely surrounds each of the respective optical fibers 12 therein. As illustrated each subunit has the same number of optical fibers, namely four optical fibers 12; however, there could be more or fewer optical fibers 12 in the respective subunits. Additionally, while three subunits 14 are illustrated in the optical fiber array 10, there could also be any suitable number of subunits in optical fiber array. Optical fiber array 10 also includes a common matrix 18 that connects, but preferably surrounds at least a portion of each of subunits 14, 14' and 14". As can best be seen in FIG. 1a, the common matrix 18 preferably holds each of the subunits 14 in a fixed planar relationship in plane P. Subunits 14, 14' and 14" are positioned adjacent one another at a plurality of interface regions I and I', which extends along the length of optical fiber array 10. Interface regions I and I' generally lie on respective axes A and A', which also extend along the longitudinal length of optical fiber array 10.

According to the concepts of the present invention, optical fiber array 10 also preferably has a plurality weakened portions 20 and 20', which are intermittently disposed along the length of optical fiber array 10 as schematically illustrated. As illustrated in FIG. 1, weakened portions 20 have a length $L_1$, and the optical fiber array 10 has a regular portion 22, which is illustrated to have a length $L_2$ between subunits 14 and 14'. A second weakened portion 20 is illustrated in FIG. 1 having a length $L_3$, which may or not be the same length as $L_1$. Likewise, weakened portions 20' have a plurality of length $L_1$ and $L_3$, and the optical fiber array 10 has a regular portion 22', which is illustrated to have a length $L_2$ between subunits 14' and 14". The pattern of intermittent weakened portions with regular portions may repeat itself along the length of the optical fiber array 10, but weakened portions 20 and 20' may have any suitable spacing. It should be noted that the weakened portions 20 and 20' are adjacent the interface region I, thereby allowing the craftsman to quickly and easily separate subunits while still providing a robust structure. In embodiments having more than two subunits it is possible to have the weakened portions along the optical fiber array 10 at all or less than all the interface regions I of each of the respective subunits 14. Similarly, there may also be more or fewer multiple axes A that can generally coincide with other respective interface regions I.

Figure 2:
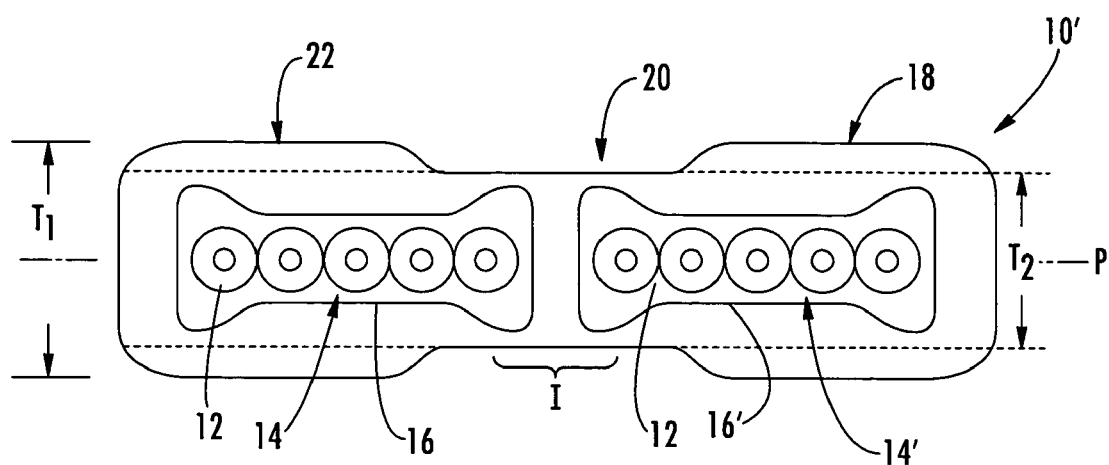
FIG. 2 is a cross sectional view of another embodiment of an optical fiber array according to the present invention.

In other words, edges of respective subunits 14, 14', and 14" are generally adjacent one another at respective interface portions I. At the weakened portions 20 and 20', common matrix 18 is preferably either broken, or as alternatively shown in FIG. 2 have a reduction in thickness ($T_2$) adjacent this location relative to the thickness ($T_1$) of the remainder of the common matrix 18 to allow the user to easily separate out the individual subunits along the length of the optical fiber array 10'. FIG. 2 depicts a gradual sloping or transition from a portion 22 having a thickness $T_1$ of the common matrix 18 to weakened portions 20 having a thickness $T_2$. In other words, optical fiber array 10' includes a plurality of weakened portions having a reduced thickness at interface I with a predetermined length $L_1$ separated by respective regular portions having a predetermined length. However, that transition may be more step-like (i.e., sharper edges) or more gradual, depending on the manner in which the optical fiber array is manufactured, including the weakened portions. Additionally, the weakened portion, when it is a reduced thickness as illustrated in FIG. 2, may extend over a portion of the width of the optical fiber array or over the entire width of the optical fiber array.

The broken or reduced thickness of the common matrix 18 at the weakened portions, allows the craftsman to quick and easy access to the subunits contained within the optical fiber array. Weakened portions 20 are preferably adjacent the interface regions of the subunits, and with, for example, a gentle twist of the optical fiber array—pushing the outside portions in one direction about the axis A as shown by the arrows F in FIG. 3, the craftsman can easily separate S the subunits 14 and 14'. If the weakened portions 20 have already caused a separation or partial separation of the subunits for the limited lengths ($L_1$ or $L_3$, for example) as discussed above, then the craftsman can more easily access the desired subunit and/or the optical fiber(s) therein. However, unlike the prior optical fiber arrays, the skilled artisan will appreciate that the present invention provides a robust structure that will not unintentionally separate or propagate an unintentional separation because the weakened portion are intermittent. Additionally, the present invention should not be confused with optical fiber arrays having continuous stress concentrations in the common matrix. These designs having continuous stress concentrations can cause undesired separation or undesired propagation of the separation, thereby causing problems. On the other hand, the present invention is advantageous because the shift from a weakened portion to a regular portion tends to inhibit the undesired separation between subunits or subsets of optical fibers.

Figure 3:
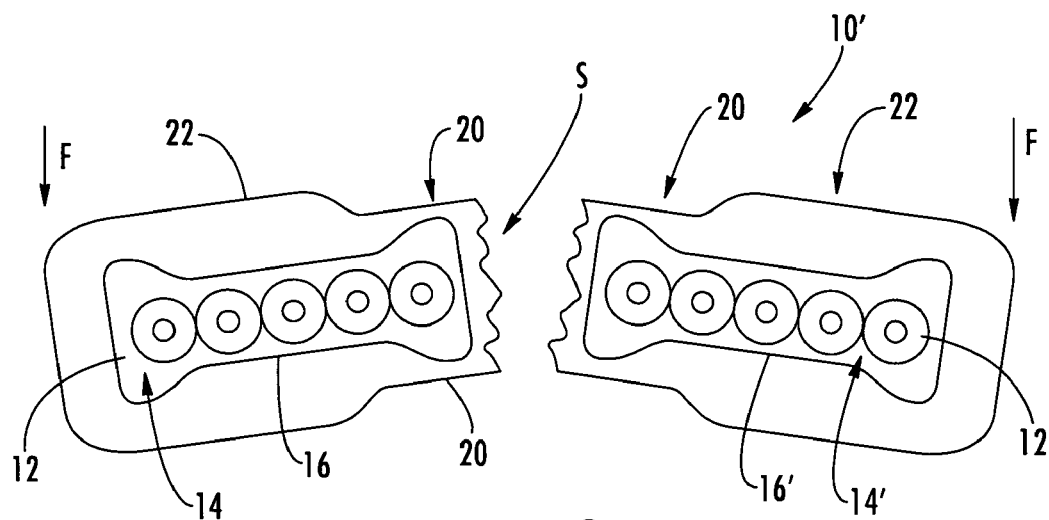
FIG. 3 illustrates the separation of the subunits in the optical fiber array of FIG. 1.

Furthermore, the present invention allows the craftsman quick, easy and reliable access to the individual subunits and optical fibers therein using intermittent weakened portions 20 of optical fiber array 10. For instance, the present invention is advantageous because the craft still enjoys the advantage of a relatively high density of optical fibers in an array that is flexible for termination, routing, or access purposes. In one embodiment, the weakened portion 20 allows the craftsmen to easily bend the optical fiber array 10 along the axis A (and at the interface region I) to separate S the subunits 14 and 14' at the weakened portion 20 as shown in FIG. 3. The craftsman could also use the presently existing tools, but those tools are not necessary with the structure of the optical fiber array 10. In other embodiments, the weakened portion 20 already has the subunits separated from one another at the intermittent locations along the length of the optical fiber array. Thus, the present invention eliminates the need for using any tools on the optical fiber array, thereby allowing quick and easy access to the subunits for connectorization, organization, and/or routing. As known in the art, the optical fiber arrays of the present invention are useful for fiber optic cables and/or tube assemblies and may be stacked, thereby creating a relatively high optical fiber density.

The length of each of the portions is preferably determined by the intended usage of the optical fiber array. For example, if the optical fiber array were to be used in an FTTx situation, then the length of the regular portion 22 may be about equal to, or smaller, relative to the lengths of the weakened portions 20. However, it is preferable that each length $L_2$ of the regular portion 22 is about ten times that of the length $L_1$ of the weakened portions 20. By way of example, for every 1.1 meters of optical fiber array, about one meter of the optical fiber array is the regular portion and about 0.1 meter is the weakened or broken portion along the longitudinal length for a ratio of about 1:10 weakened to regular portions. In an exemplary FTTx application, the ratio may be altered so that there are more frequent areas with weakened portions 20 to allow for easier installation, routing, and connectorization by having more frequent easy access points along the longitudinal length. For instance, for every about 0.2 meter of regular portions, there would be about 1 meter of the weakened portion for a ratio of about 5:1 weakened to regular portions.

Due to the structure of the optical fiber array 10 and the use of common matrix 18, the subunits 14 and 14', along with subunits 14 and 14" will typically easily and first separate at the weakened portions 20 and 20'. Naturally, the installer can use some force to separate the subunits 14 along a longer length of optical fiber array 10 than just the length $L_1$ of the weakened portion 20 once common matrix 18 is broken. In other words, once the subunits are separated it is easy for the craftsman to propagate the separation of subunits along the longitudinal length of the optical fiber array. Additionally, as best shown in FIG. 1a, weakened portions 20 are formable on one or more surfaces of common matrix 18. Having broken common matrix 18 on both sides allows extremely easy access for the craftsman. Separating the subunits 14 of the optical fiber array 10 at various locations along a length of the optical fiber array 10 in a subsequent manufacturing step also tends to reduce the preferential bend nature, allowing easier routing of the optical fiber array 10, where a relatively high ratio such as 5:1 is used.

The weakened portions of the optical fiber array can take a number of different configurations and/or be formed in a number of different ways according to the present invention. Illustratively, FIG. 2 depicts subunits 14 and 14' having a non-uniform thickness in the cross-sectional shape as disclosed in U.S. patent application Ser. No. 10/411,406 filed on Apr. 10, 2003, which is incorporated herein by reference. In this case, the subunits have a generally dogbone shape where the thickness is larger at the end portions for controlling the location of fracturing of the common matrix. In other words, the subunit matrix has a thickness in cross-section that generally increases about one or more of the end optical fibers of the subunit.

Figure 4:
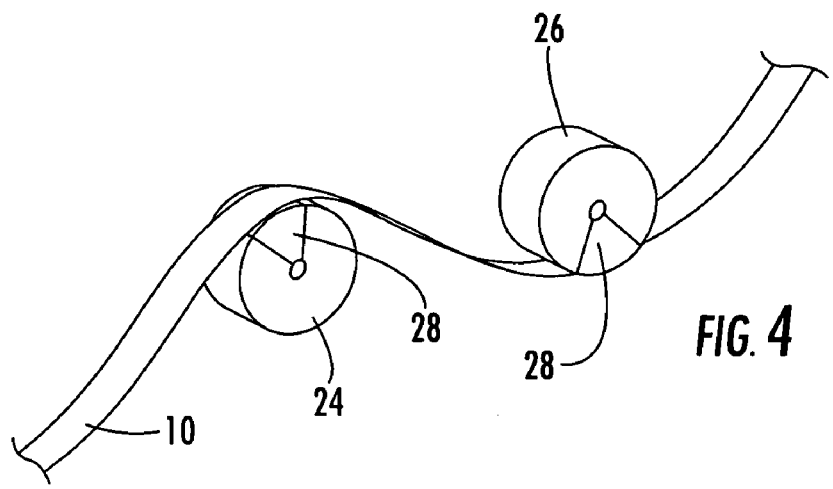
FIG. 4 illustrates one method of creating a weakened portion in an optical fiber array.
Figure 5:
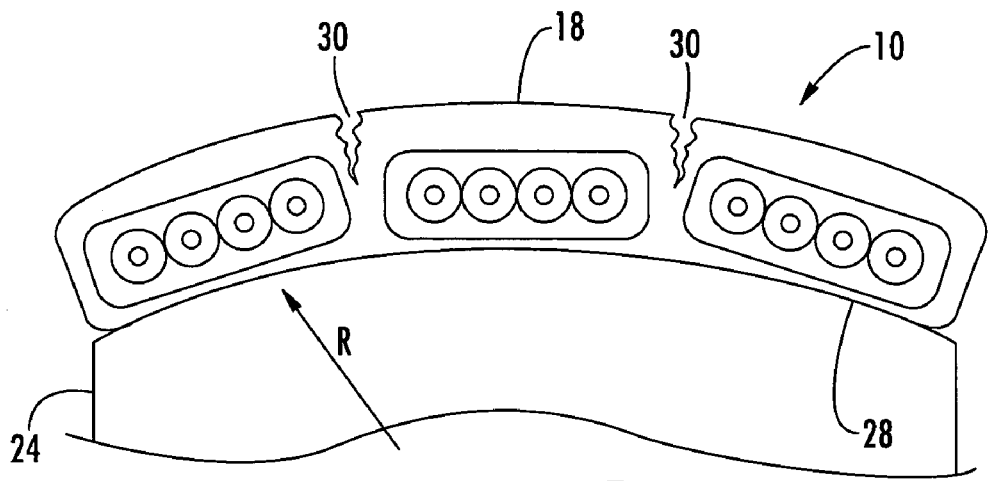
FIG. 5 is a cross section of an optical fiber array and a partial cross section of a roller from FIG. 4.

One method of forming the weakened portions or separated portions in the common matrix during the manufacturing process is illustrated in FIGS. 4–5. As shown in FIG. 4, after the common matrix 18 has cured, the optical fiber array 10 is rolled around the rollers 24,26, which both have a portion 28 configured to induce a crack 30 in the common matrix 18, thereby creating the weakened or broken portion 20 in the common matrix. In this case, portion 28 of rollers 24,26 are a rounded portion as illustrated in FIG. 5 for initiating crack 30 along interface region I. A radius of curvature R of the rollers will dictate how deeply the crack 30 will penetrate into the common matrix 18. The smaller the radius of the roller, the higher the probability that crack 30 will penetrate more deeply into optical fiber array 10. Typically, the optical fiber array 10 is routed over two rollers 24,26 to induce crack 30 on both sides; however, depending on the radius or profile of the rollers 24,26, only one roller may be needed. Alternatively, roller may have an offset profile with a raised portion to cause the subunits to be separated along the interface region I, but other suitable roller profiles are possible.

Figure 6:
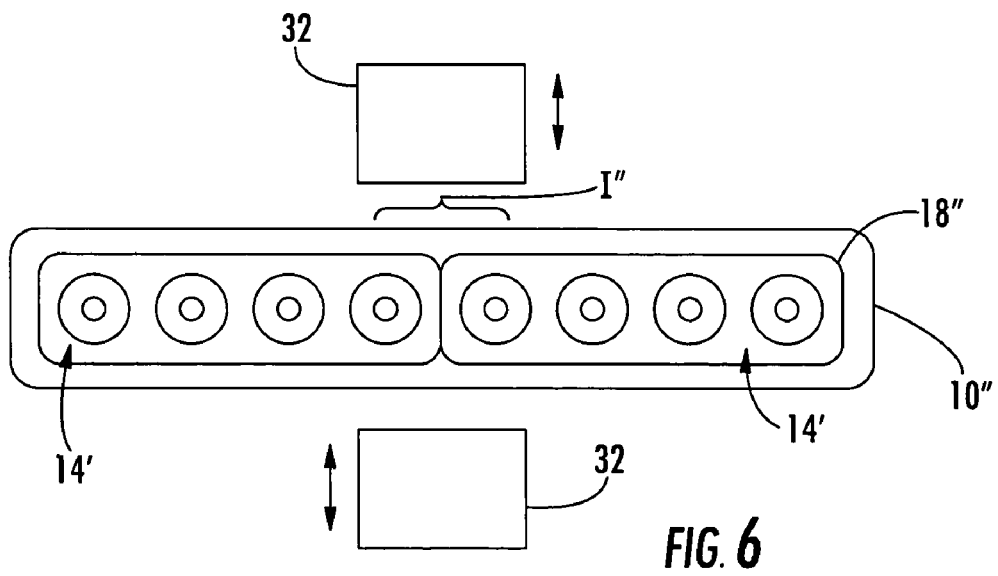
FIG. 6 illustrates the formation of a weakened portion in the common matrix of an optical fiber array.
Figure 7:
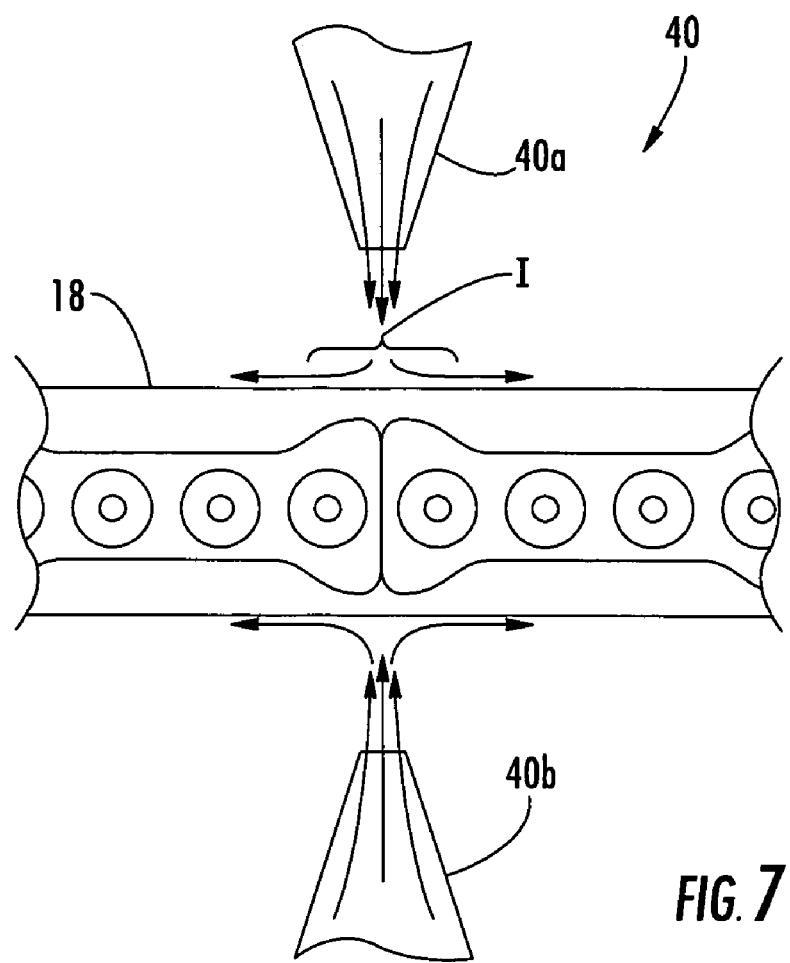
FIG. 7 illustrates one method of forming a reduced portion in the common matrix of an optical fiber array according to the present invention.
Figure 8:
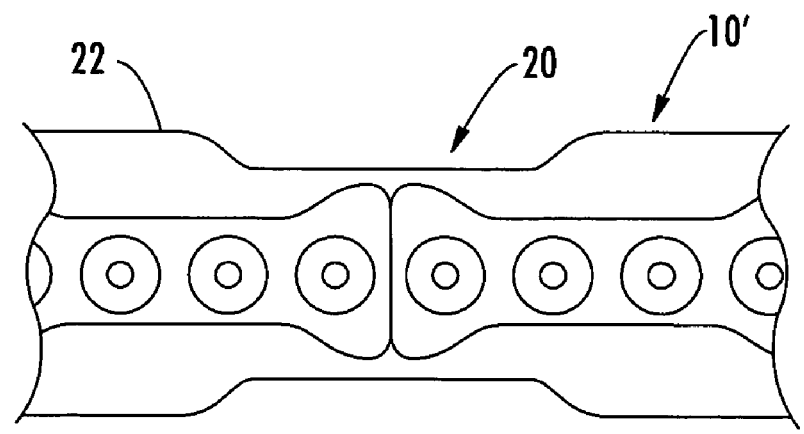
FIG. 8 is a cross section of a portion of the optical fiber array made in accordance with the method illustrated in FIG. 7.
Figure 9:
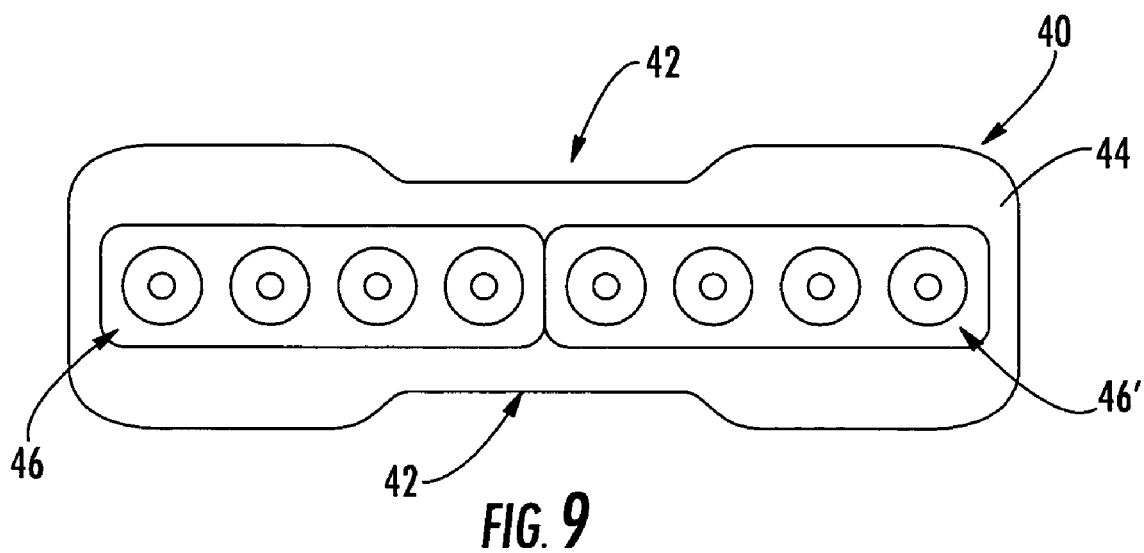
FIG. 9 illustrates a cross-sectional view of another embodiment of an optical fiber array according to the present invention.
Figure 10:
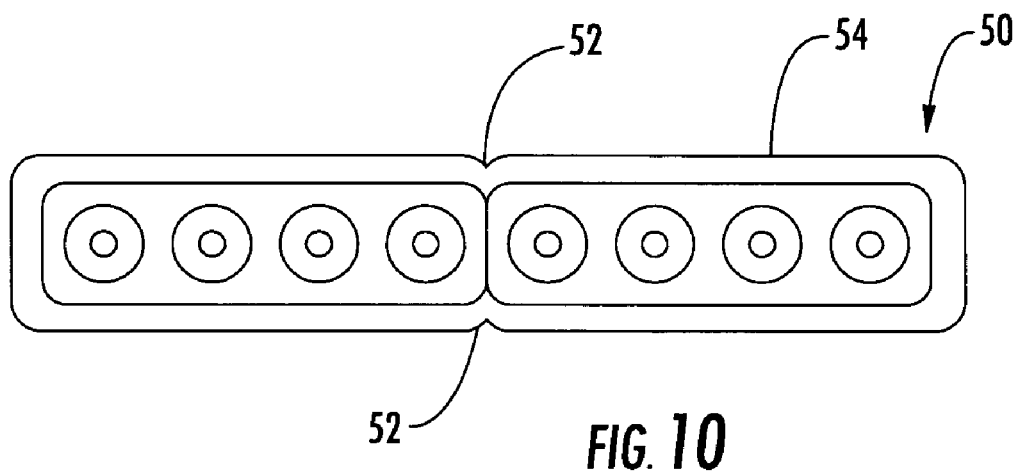
FIG. 10 illustrates a cross-sectional view of still another embodiment of an optical fiber array according to the present invention.

Some of the alternative methods for making the weakened portion 20 of the optical fiber array 10 are illustrated in FIGS. 6–8. It should be noted that while the common matrix may be able to be directly applied to optical fiber array 10 in the configuration illustrated in FIG. 2, typically the application of matrix material requires a slower processing speed than is used with normal application of matrix material. While such methods are envisioned according to the present invention, they are not presently commercially viable. Therefore, other methods are disclosed. As shown in FIG. 6, an end view of an optical fiber array 10" is illustrated with devices to create the weakened portion in optical fiber array 10". For example the device 32 could be a laser to cut away a portion of the common matrix 18" for forming the weakened portion. The device 32 may also be sharp edge or blade that is raised and lowered, as illustrated by the arrows, to cut away a portion of common matrix 18" or to simply make a cut into common matrix 18" over the interface region I". Examples of such embodiments are illustrated in FIGS. 9 and 10. In FIG. 9, an optical fiber array 40 appears to have another configuration that is similar to the embodiment in FIG. 2. However, optical fiber array 40 has a plurality of weakened portions 42 formed by cutting the common matrix 44. Additionally, the subunits 46 and 46' have a more conventional, uniform cross-sectional shape, rather than the generally dog bone shape discussed above. An optical fiber array 50 as shown in FIG. 10, has more of a groove 52 intermittently cut into common matrix 54. Groove 52 may be of any depth, including all of the way through optical fiber array 50. Similarly, the device 32 may also be an air knife that likewise intermittently cuts away a portion of the common matrix as in FIG. 9 or makes an intermittent cut as in groove 52 in FIG. 10 into the common matrix before curing of the same.

Another device used in a method for making the optical fiber 10' array is illustrated in FIG. 7, with the resultant configuration illustrated in FIG. 8. The device 40 preferably comprises two nozzles 40a,40b, which directs a jet such as a gas jet onto common matrix 18, after it is applied to the optical fiber array 10', but prior to curing of common matrix 18. The gas jet is controlled to push the common matrix outwardly from the interface region I in an intermittent fashion along the length of optical fiber array 10'. Thereafter, common matrix 18 is cured, thereby creating weakened portions 20 where common matrix 18 was pushed out as shown in FIG. 8. Typically, the gas jet is regular air, but any suitable gas or fluid could be used. While two nozzles are illustrated in FIG. 7, only one at a time may be used. Also, there would preferably be at least one nozzle for each interface region across the width of the optical fiber array. For example, if there were three subunits and two interface regions, then there could be two nozzles, or two sets of nozzles if used on the top and bottom of optical fiber array to create the weakened portions in the optical fiber array. As noted above, since the weakened portions at adjacent interface portions need not be at the same lengthwise location on the optical fiber array, the nozzles may be placed at different locations on the manufacturing line. Additionally, by timing the flow of gases, the location of the weakened portions may be placed in any configuration on the optical fiber array.

Furthermore, the concepts of the present invention can use subunits 14 having any suitable design. For example, the subunits in optical fiber array 10 have a generally uniform thickness in cross-section, whereas the subunits of FIG. 2 have a dogbone or non-uniform thickness in cross-section. In other words, the configuration of the subunits is not critical to the concepts of the present invention. Additionally, it should be noted that the adhesion characteristics of the subunit matrix 16 to the common matrix 18 may be altered through chemical, electrical, or mechanical surface techniques. With these techniques, the adhesion characteristics may also be varied along the length of the optical fiber array to create the weakened portions of the optical fiber array. Likewise, the modulus of the common matrix or the subunit matrix can have the same or different values as know in the art.

Many modifications and other embodiments of the present invention, within the scope of the appended claims, will become apparent to a skilled artisan. For example, optical fiber arrays of the present invention can be disposed into a stack for increasing optical fiber density within a cable. Additionally, optical fiber arrays can have other suitable constructions or components as known in the art. For instance, the concepts of the present invention can be used with an optical fiber array having a single matrix material, rather than subunits having an individual matrix. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation.

We claim:

1. An optical fiber array having a length comprising:
   a first subunit, the first subunit including at least one optical fiber and a first subunit matrix;
   a second subunit, the second subunit including at least one optical fiber and a second subunit matrix;
   a common matrix, the common matrix connecting the first subunit and the second subunit, thereby holding the first and second subunits adjacent one another so that an interface region is defined by the adjacent end portions of the first subunit and the second subunit along a longitudinal plane, the common matrix having a plurality of weakened portions adjacent the interface region, wherein the plurality of weakened portions extend intermittently along an longitudinal length of the optical fiber array for easy separation of the first subunit and the second subunit.

2. The optical fiber array of claim 1, wherein the plurality of weakened portions are disposed on only one side of the common matrix of the fiber optic array.

3. The optical fiber array of claim 1, wherein the plurality of weakened portions are disposed on both sides of the common matrix of the fiber optic array.

4. The optical fiber array of claim 1, wherein the plurality of weakened portions are comprised of the common matrix being at least partially fractured on one or more sides of the common matrix of the fiber optic array.

5. The optical fiber array of claim 4, wherein the plurality of weakened portions of the common matrix are fractured completely through the common matrix.

6. The optical fiber array of claim 1, the optical fiber array having a ratio of weakened to regular portions between about 1:10 and about 5:1.

7. The optical fiber array of claim 1, the optical fiber array having a ratio of weakened to regular portions of about 1:10.

8. The optical fiber array of claim 1, wherein the plurality of weakened portions are created during the manufacturing process.

9. The optical fiber array of claim 8, wherein the plurality of weakened portions are created by a device selected from the group including rollers, lasers, sharp edges, blades, and air knives.

10. The optical fiber array of claim 1, wherein the fiber optic array has a plurality of second longitudinal portions that are disposed between the plurality of weakened portions, wherein the plurality of weakened portions have a reduced thickness of common matrix relative to a thickness of the plurality of second longitudinal portions.

11. The optical fiber array of claim 1, wherein the optical fiber array has a third subunit.

12. The optical fiber array of claim 1, wherein the optical fiber array includes a third subunit and the first subunit, the second subunit, and the third subunit all have the same number of optical fibers.

13. The optical fiber array of claim 1, wherein the optical fiber array includes a third subunit and the first subunit, the second subunit, and the third subunit all have the same number of optical fibers, wherein the plurality of weakened portions have a reduced thickness of common matrix relative to a thickness of the plurality of second longitudinal portions.

14. The optical fiber array of claim 1, wherein the optical fiber array includes a third subunit, wherein the common matrix includes a second plurality of weakened portions extending intermittently along an longitudinal length of the optical fiber array generally adjacent to an interface region between the second subunit and third subunit, wherein the second plurality of weakened portions allow for easy separation of the second subunit and the third subunit.

15. The optical fiber array of claim 1, wherein the first and second subunit matrix have a cross-sectional thickness that generally increases about one of the two end optical fibers of the first or second subunits.

16. The optical fiber array of claim 1, the optical fiber array being a portion of a fiber optic cable.

17. An optical fiber array having a length comprising:
a first subunit, the first subunit having at least one optical fiber and a first subunit matrix;
a second subunit, the second subunit having at least one optical fiber and a second subunit matrix; and
a common matrix, the common matrix connecting the first subunit and second subunit so that the first and second subunits are adjacent one another at an interface portion and are disposed in a fixed planar relationship along a longitudinal plane, the optical fiber array having at least one first portion adjacent the interface portion extending in a longitudinal direction along at least a portion of the optical fiber array and having a first thickness and the optical fiber array having at least one second portion adjacent the interface portion extending in a longitudinal direction that is disposed along at least a portion of the optical fiber array at a downstream portion having a second thickness, wherein the first thickness is greater than the second thickness, thereby creating a weakened portion for separating the first subunit and the second subunit.

18. The optical fiber array of claim 17, wherein the optical fiber array has a third subunit.

19. The optical fiber array of claim 17, wherein the optical fiber array includes a third subunit and the first subunit, the second subunit, and third subunit all have the same number of optical fibers.

20. The optical fiber array of claim 17, wherein the at least one second portion extends intermittently along the length of the fiber array.

21. The optical fiber array of claim 17, wherein the at least one second portion extends across only a portion of the fiber array, the portion including at least the interface portion.

22. The optical fiber array of claim 17, wherein the optical fiber array has a first plurality first portions and a second plurality of second portions, each of the second plurality of second portions being disposed between two of the first plurality of first portions along the longitudinal direction of the optical fiber array.

23. The optical fiber array of claim 17, wherein the first portion extends in the longitudinal direction for a first predetermined length and the second portion extends in the longitudinal direction for a second predetermined length, the first predetermined length being longer than the second predetermined length.

24. The optical fiber array of claim 17, wherein the optical fiber array having a ratio of weakened portions to regular portions between about 1:10 and about 5:1.

25. The optical fiber array of claim 17, wherein the optical fiber array having a ratio of weakened to regular portions of about 1:10.

26. The optical fiber array of claim 17, wherein the first and second subunit matrix have a cross-sectional thickness that generally increases about one of the two end optical fibers of the first or second subunits.

27. The optical fiber array of claim 17, wherein the first subunit matrix and the second subunit matrix include a dog bone shape in cross section.

28. The optical fiber array of claim 17, the optical fiber array being a portion of a fiber optic cable.

29. An optical fiber array having a length comprising:
a plurality of optical fibers;
at least one matrix material, the at least one matrix material connecting the plurality of optical fibers, wherein the at least one matrix material includes a plurality of weakened portions intermittently spaced along a longitudinal length of the optical fiber array so that the plurality of optical fibers may be separated into two distinct groups.

30. A method of making an optical fiber array having at least one intermittent separation between subunits comprising the steps of:

providing an optical fiber array, the optical fiber array comprising a first subunit, the first subunit having at least one optical fiber and a first subunit matrix;

a second subunit, the second subunit having at least one optical fiber and a second subunit matrix; and a common matrix, the common matrix connecting the first subunit and second subunit so that the first and second subunits are adjacent one another at an interface portion and are disposed in a fixed planar relationship along a longitudinal plane, the optical fiber array having at least one first portion adjacent the interface portion extending in a longitudinal direction along at least a portion of the optical fiber array and having a first thickness and the optical fiber array having at least one second portion adjacent the interface portion extending in a longitudinal direction along at least a portion of the optical fiber array and having a second thickness;

causing the first subunit and the second subunit to have a plurality of intermittent weakened portions along at least a longitudinal length of the optical fiber array.

31. The method according to claim 30, wherein the step of causing the first and second subunits to have a plurality of intermittent weakened sections separate further comprises moving the optical fiber array over at least one curved roller.

32. The method according to claim 30, wherein the step of causing the first and second subunits to have a plurality of intermittent weakened sections further comprising projecting a gas stream onto the optical fiber array.

33. The method according to claim 30, wherein the step of causing the first and second subunits to have a plurality of intermittent weakened sections further comprising twisting the optical fiber array around an axis extending in the longitudinal direction.

34. The method according to claim 30, wherein the step of causing the first and second subunits to have a plurality of intermittent weakened sections further comprising bending the first and second subunits about an axis extending in the longitudinal direction of the optical fiber array.

35. A method of making an optical fiber array having at least one intermittent separation portion comprising the steps of:

providing a first subunit, the first subunit having at least one optical fiber and a first subunit matrix;

providing a second subunit, the second subunit having at least one optical fiber and a second subunit matrix;

providing a common matrix for connecting the first subunit and second subunit, so that the first and second subunits are adjacent one another at an interface portion and are disposed in a fixed planar relationship along a longitudinal plane; and intermittently directing a fluidized jet onto common matrix along the interface portion prior to curing the common matrix to create a plurality of weakened portions along at least a portion of the optical fiber array that are separated by regular portions along a longitudinal length of the optical fiber array.

* * * * *